United States Patent
Doverspike et al.

(10) Patent No.: US 7,450,496 B1
(45) Date of Patent: Nov. 11, 2008

(54) METHOD FOR SELECTING RESTORATION PATH IN A MESH NETWORK

(76) Inventors: Robert Duncan Doverspike, 63 Surrey La., Tinton Falls, Monmouth County, NJ (US) 07724; Charles Robert Kalmanek, Jr., 86 Great Hills Rd., Short Hills, Essex County, NJ (US) 07078; Guangzhi Li, 110-2 Sussex St., Harrison, Gloucester County, NJ (US) 07029

(*) Notice: Subject to any disclaimer, the term of this patent is extended or adjusted under 35 U.S.C. 154(b) by 116 days.

(21) Appl. No.: 11/649,416

(22) Filed: Jan. 4, 2007

Related U.S. Application Data

(63) Continuation of application No. 11/240,105, filed on Sep. 30, 2005, now Pat. No. 7,180,852, which is a continuation of application No. 09/909,102, filed on Jul. 19, 2001, now Pat. No. 6,982,951.

(60) Provisional application No. 60/257,029, filed on Dec. 21, 2000.

(51) Int. Cl.
*H04L 12/26* (2006.01)

(52) U.S. Cl. .......... 370/217; 370/221; 370/225; 370/400; 709/239; 379/221.04

(58) Field of Classification Search .......... 370/218, 370/225, 226, 227
See application file for complete search history.

(56) References Cited

U.S. PATENT DOCUMENTS

| 5,218,601 | A | * | 6/1993 | Chujo et al. ............... 370/228 |
| 5,812,524 | A | * | 9/1998 | Moran et al. .............. 370/228 |
| 5,941,992 | A | * | 8/1999 | Croslin et al. ............. 714/4 |
| 5,943,314 | A | * | 8/1999 | Croslin ..................... 370/216 |
| 6,282,170 | B1 | * | 8/2001 | Bentall et al. ............. 370/225 |
| 6,324,162 | B1 | * | 11/2001 | Chaudhuri ................ 370/225 |
| 6,600,719 | B1 | * | 7/2003 | Chaudhuri ................ 370/228 |
| 6,725,401 | B1 | * | 4/2004 | Lindhorst-Ko ............ 714/47 |

* cited by examiner

*Primary Examiner*—Gregory B Sefcheck
*Assistant Examiner*—Brian Roberts

(57) ABSTRACT

A method of selecting a restoration path in a mesh telecommunication network is disclosed that advantageously is practical and flexible and may be pre-computed along with a service connection path during the setup of the connection. The information used to select the restoration path can be advantageously distributed among nodes in the network.

10 Claims, 5 Drawing Sheets

| LINKS | FROM | TO | SPANS | MASTER |
|---|---|---|---|---|
| 0 | A | B | 0:1:2 | A |
| 1 | A | C | 0 | A |
| 2 | C | B | 1:2 | B |
| 3 | C | F | 1:3:5 | F |
| 4 | C | D | 7 | C |
| 5 | A | D | 8 | A |
| 6 | D | F | 6 | F |
| 7 | D | E | 6:5:4 | E |
| 8 | F | E | 5:4 | F |
| 9 | E | B | 4:3:2 | B |

METHOD FOR SELECTING RESTORATION PATH IN A MESH NETWORK

CROSS REFERENCE TO RELATED APPLICATIONS

This application is a continuation of prior application Ser. No. 11/240,105 filed Sep. 30, 2005 now U.S. Pat. No. 7,180,852, which is a continuation of prior application Ser. No. 09/909,102 filed Jul. 19, 2001 now U.S. Pat. No. 6,982,951, which claims the benefit of U.S. Provisional Application No. 60/257,029, filed on Dec. 21, 2000, the contents of which are incorporated herein by reference.

REFERENCED-APPLICATIONS

This application is related to United States Utility patent application, "METHODS AND SYSTEMS FOR FAST RESTORATION IN A MESH NETWORK OF OPTICAL CROSS CONNECTS," Ser. No. 09/474,031, filed on Dec. 28, 1999, which is incorporated by reference herein.

BACKGROUND OF THE INVENTION

The invention relates to telecommunications networks, and more particularly to selecting restoration paths in a telecommunications network.

Modern telecommunication networks are reconfigurable and provide for fast restoration from network failures. For example, and in the context of optical networking, Synchronous Optical Network (SONET) rings provide the primary technology for optical layer communication and restoration from network failures. SONET rings tend to be capacity inefficient when compared to "mesh" topologies in networks with a high degree of connectivity and when, because of size limitations, connections are forced to route through many interconnected rings. As optical-cross connects (OXCs) are deployed within today's transport networks based on wavelength-division multiplexing (WDM), the potential emerges to provide on-demand establishment of high-bandwidth connections (also referred to in the art as "lightpaths"). Emerging standards such as Multi-Protocol Lambda Switching ("MPL(ambda)S") provide a standardized optical network control plane that is essential for building an effective platform for vendor interoperability. See, e.g., D. Awduche et al., "Multi-Protocol Lambda Switching: Combining MPLS Traffic Engineering Control with Optical Crossconnects," IETF Internet Draft, http://www.ietf.org/internet-drafts/draft-awduche-mpls-te-optical-01.txt (November 1999). Unfortunately, few recent contributions to the art have addressed the need for fast failure restoration in such networks.

In co-pending commonly-assigned United States Utility patent application, "METHODS AND SYSTEMS FOR FAST RESTORATION IN A MESH NETWORK OF OPTICAL CROSS CONNECTS," Ser. No. 09/474,031, filed on Dec. 28, 1999, which is incorporated by reference herein, a restoration methodology is disclosed that utilizes pre-computed restoration routes disjoint from the normal communication path—but wherein the channels/wavelengths may be chosen dynamically during the restoration process. The invention therein disclosed can potentially provide restoration competitive with SONET ring restoration speeds. There is, however, still a need for a flexible and practical methodology for selecting an advantageous restoration path that may be utilized in a restoration process such as the one disclosed in the above application. Moreover, there is a need for a distributed approach to restoration that permits the information needed for restoration path selection to be distributed throughout the network with a minimum amount of signaling overhead.

SUMMARY OF THE INVENTION

A method of selecting a restoration path in a mesh telecommunication network is disclosed that advantageously is practical and flexible and may be pre-computed along with a service connection path during the setup of the connection. The restoration path is selected from a graph of links in the network which are physically diverse from the service path. For example, In the context of optical networking, the links do not share a common fiber span with the service path. Weights are computed for the links using an array representing a restoration link capacity—which is expressed as a number of channels/wavelengths in optical networking—needed on each link over possible failures of the service path. The restoration path is selected by minimizing the weights for each link in the restoration path. In accordance with another aspect of the invention, the information used to select the restoration path is advantageously distributed among nodes in the network. A source node selecting a service path through the network to a destination node sends a first message along the service path to the destination node, thereby setting up cross-connections for the service path. The destination node sends a second message back to the source node along nodes in the service path responsible for maintaining link information, whereby the nodes update the message with an array representing a restoration link capacity (channels/wavelengths) needed on each link over possible failures of the service path. The array is used by the source node to select the restoration path. The source node then sends a third message along the service path and the restoration path to reserve resources. This provides a distributed approach for establishment of restorable connections in a dynamically reconfigurable mesh network with a minimum amount of signaling overhead. Restoration paths are advantageously diverse from service connection paths while restoration link capacity advantageously may be shared among different connections that would re-route over the restoration path during non-simultaneous failures.

These and other advantages of the invention will be apparent to those of ordinary skill in the art by reference to the following detailed description and the accompanying drawings.

DETAILED DESCRIPTION OF THE INVENTION

Figure 1:
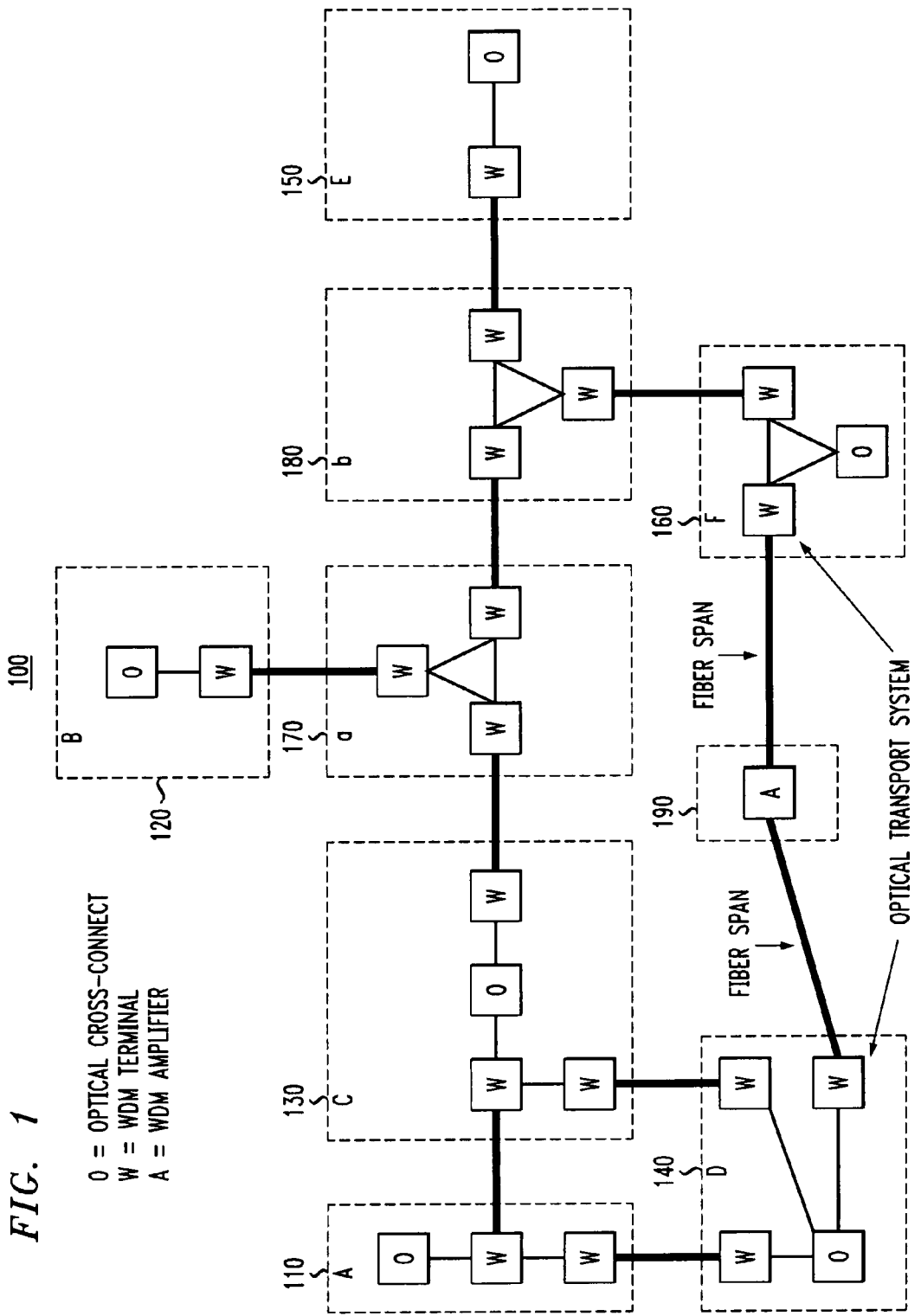
FIG. 1 illustrates an interconnection of optical cross-connects and optical transport systems.

FIG. 1 is a mesh network 100, illustratively an optical network, organized into a general topology of links and nodes 110, . . . , 190, in contrast to a rigid ring or chain or other such structure. Although depicted in FIG. 1 and described herein particularly in the context of optical networking, the invention can be readily appreciated by those of ordinary skill in the art to apply to cross-connect technologies in general, e.g. Gigabit Ethernet, OXCs with electrical fabrics, etc.

Figure 2:
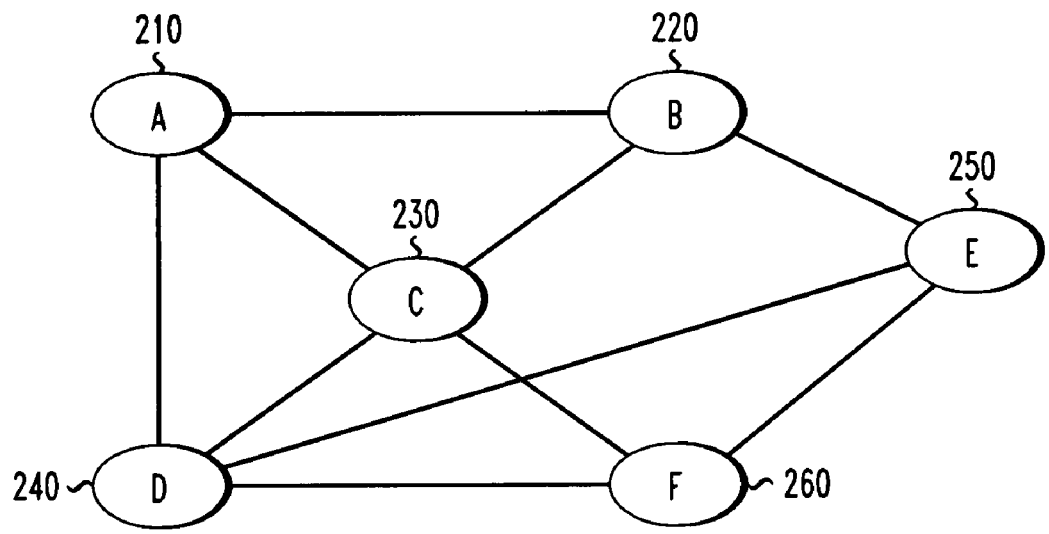
FIG. 2 and FIG. 3 are conceptual representations of the optical network and the fiber span network, as shown in FIG. 1.

With reference to FIG. 1, optical mesh network 100 comprises optical cross-connects (OXCs) and optical transport systems (OTSs). The optical cross-connects (depicted as boxes labeled "O" in FIG. 1) provide end-to-end optical connections, sometimes colloquially referred to as "lightpaths." The optical transport systems in FIG. 1 comprise pairs of bidirectional Wavelength Division Multiplexer (WDM) terminals (depicted as boxes labeled "W") and amplifiers at intermediate locations where needed (depicted as boxes labeled "A"). The WDM terminals multiplex optical signals at different wavelengths into a single optical fiber for each direction of transmission using gratings or some equivalent technology. Each signal multiplexed by the optical transport system is traditionally referred to as an optical "channel", each channel transporting a signal (e.g., SONET OC-48/192, SDH STM-16/48, Gigabit Ethernet) usually associated with a link between nodes of higher-layer telecommunications networks such as routers or ATM switches. The signals between the OXC and the WDM terminals are typically converted to a shorter, standard cross-office wavelength by optical transponders, not shown in FIG. 1, usually to avoid wavelength translation within the OXC. Collections of optical fibers that are co-located in the same cable, conduit, or substructure between two consecutive points of access—such as a manhole, central office, or amplifier site—are referred to herein as "fiber spans." An "optical link", as that term is utilized herein, is used to refer to a collection of channels that route over the same fiber spans between a pair of OXCs. Accordingly, mesh network 100 may be represented as consisting of multiple layers: an "optical" network graph and a "fiber span" network graph illustrated by FIGS. 2 and 3 respectively. The fiber span network is the graph $G_s=(N_s, E_s)$, where N is the set of nodes—that represent locations, generally where WDM equipment can be placed—and E is the set of fiber spans. Let $N_0$ be the set of the OXC nodes where $N_0 \subset N_s$. The graph of the optical network is $G_0=(N_0, E_0)$, where $N_0$ is the set of OXC nodes and $E_0$ is the set of optical links which are routed on the fiber span network of $G_s$.

Each OXC has an associated optical layer control function, integrated with the OXC or residing physically on a separate controller, which controls the cross-connections of the OXCs and which can be used to communicate with the other OXCs. See, e.g., co-pending commonly-assigned United States utility patent applications, "METHOD AND APPARATUS FOR ROUTING INFORMATION OVER OPTICAL AND ELECTRICAL PATHWAYS," Ser. No. 09/685,953, filed Oct. 12, 2000; "CONTROL OF OPTICAL CONNECTIONS IN AN OPTICAL NETWORK," Ser. No. 09/769,735, filed Jan. 26, 2001; and "CONTROL OF OPTICAL CONNECTIONS IN AN OPTICAL NETWORK," Ser. No. 09/769,780, filed Jan. 26, 2001, which are incorporated by reference herein. It is assumed, without limitation, that the optical layer control function is distributed. The cross-connection controllers can communicate with one another across a dedicated signaling channel (or a separate signaling network) using known protocols such as Open Shortest Path Forwarding (OSPF). See, e.g. J. Moy, "OSPF Version 2," IETF Network Working Group, RFC 2328 (April 1998); R. Coltun, "The OSPF Opaque LSA Option," IETF Network Working Group, RFC 2370 (July 1998). OSPF link state advertisement (LSA) messages can be utilized to disseminate topology and channel usage information. It is advantageous to configure one OXC as a "master" OXC node for each fiber span and optical link, thereby allocating the control of the fiber span and optical link data among the OXCs in an unambiguous way. The master nodes are responsible for maintaining the link Information. For each fiber span, if there is an OXC present at both terminating nodes of the fiber span, one can arbitrarily configure the OXC with lexicographically or numerically higher ID as the master. If there is only one OXC node present at a terminating node of the fiber span, then this node can be designated the master. If neither node has an OXC present, it is necessary to configure a neighbor OXC node as the proxy master of the fiber span. See tables in FIG. 2 and FIG. 3 for examples. The two OXC nodes for each optical link should maintain information about the fiber spans which the optical link passes through and the masters of the fiber spans. All the information can be static and provided by initial configuration.

It is assumed that mesh network 100 provides for restorable connections that may be established and torn down dynamically. Selecting optimal restoration parameters involves a variety of considerations and objectives.

Figure 3:
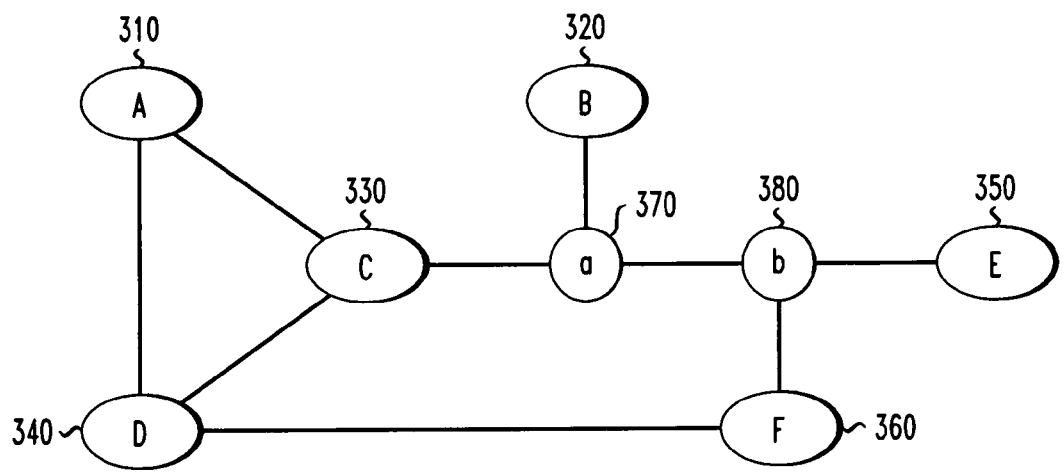

First, it is advantageous to select a restoration path $P_r$ that is physically "diverse" from the service connection path $P_s$. In other words, the restoration path and the service connection path should not belong to a group of links (referred to in the art as a "shared risk link group") sharing some common infrastructure that could subject the links to a possible single failure, e.g. a backhoe cutting a single fiber conduit. Consider FIG. 2, the optical link map representation of FIG. 1, which has six OXC nodes (the location nodes in FIG. 1 deployed with OXCs) and ten optical links indexed as set forth in the table. If the service path for a connection from OXC node A (210) to OXC node C (230) routes directly over the optical link from A-C (optical link ID=3), then it appears from FIG. 2 that the restoration path from OXC node A (210) to OXC node B (220) to OXC node C (230) (link IDs 0-2-1) would be adequate. An examination of FIG. 3, the fiber span network, however, reveals otherwise. In FIG. 3, which has eight location nodes and nine fiber spans Indexed as set forth in the table, it is clear that the restoration path A-B-C is not diverse from the service path A-C. Accordingly, in selecting a restoration path, it is important to consider the routing of optical links over fiber spans—and to avoid, if topologically possible, the sharing of any common fiber span.

Second, it is advantageous to share restoration channels on a common link of multiple restoration paths, in particular where fiber span failures are non-simultaneous. Unused channels may be reserved, i.e. not used for service paths, to ensure that adequate restoration capacity is available upon failure (alternatively, a dedicated restoration connection—referred to in the art as "1+1" protection—can be utilized although this tends to be impractical except for some high-priority services). A single restoration channel on a common link of multiple restoration paths can be shared by non-simultaneous fiber span failures. For example, a channel can be used on a link of restoration path $P_{r1}$ to reroute service path $P_{s1}$ due to failure of fiber span i along $P_{s1}$. That same channel can be used to reroute service path $P_{s2}$ to restoration path $P_{r2}$ due to failure of fiber span j along $P_{s2}$ as long as failures i and j do not occur simultaneously. On the path of $P_r$, enough channels should be reserved such that in any single fiber span failure, there are enough channels to restore all failed service paths. The total reserved channels, however, should be as small as possible.

In accordance with an aspect of the invention, the restoration path is selected in a manner that permits restoration channels to be dynamically assigned and shared when a given fiber span fails. The restoration path selection method can be utilized, without limitation, with a restoration architecture as disclosed in co-pending, commonly-assigned United States Utility Patent Application. "METHODS AND SYSTEMS FOR FAST RESTORATION IN A MESH NETWORK OF OPTICAL CROSS CONNECTS," Ser. No. 09/474,031, filed on Dec. 28, 1999, which is incorporated by reference herein. As disclosed therein, pre-computed restoration paths may be stored at the endpoint nodes of the connection and utilized, upon a network failure, to reroute the service connection. Although described with particular reference to the restoration method described therein, one of ordinary skill in the art would readily recognize how to utilize the invention with other restoration methods. Requests to establish optical connections arrive at an OXC typically from a higher layer node (e.g., an Internet Protocol (IP) layer or element management system) via a User Network Interface (UNI). See, e.g. McAdams, L. and J. Yates, eds., "User to Network Interface (UNI) Service Definition and Lightpath Attributes," OIF Architecture Group, OIF2000.61 (2000). Each optical connection request may include restoration options, such as whether the connection should be restorable if it fails due to a network failure and, if so, whether the channels of the restoration path are dedicated to this connection or shared among other connections that fail from other potential, non-simultaneous failures. If shared, the network resources can be used more efficiently because fewer total channels need to be reserved for restoration. For example, a connection request, V, can be represented in the form <source, destination, restoration-type, size> where source is the origin OXC ID, destination is the terminus OXC ID, restoration-type is the type of restoration capability required for the connection (e.g. 1+1, non-restorable, mesh-restorable), and size is the bandwidth needed for the connection (e.g. represented as the number of channels needed for the connection).

The process of computation of service path and restoration path for a connection request relies on the information about the availability of optical network resources and the path selection objective. A general heuristic is to create some cost metric and select a "minimum weight" path among all suitable paths that minimizes the cost metric and has the required size for the connection request. Additionally, several information metrics are involved in the path selection process when restoration resources may be shared between different restoration paths. For example, each link has a maximum number of Installed channels, per the link augmentation (planning) processes: of that total, some channels are assigned to service paths while other channels are reserved for restoration paths. The remaining channels are unassigned and free to be allocated to new connections. Changes in the metrics need to be advertised, e.g. as part of LSAs in extended OSPF, so that accurate information is available to every node.

SERVICE PATH. Selecting a service path in response to the communication request, accordingly, may be accomplished by computing a path between the source and destination that minimizes some cost metric and which has the required size for the connection request. It is assumed that each OXC node has knowledge of the whole optical network topology and the number of free channels on each link as well as some optical link weight function. A known shortest path algorithm such as Dijkstra's shortest path algorithm may be used to compute the minimal weight path through the network.

RESTORATION PATH: Selecting a restoration path in response to a communication request requiring a mesh-restorable connection is more challenging. It should be noted that the restoration path may not be the "min weight" path in any typical sense, because it can share restoration resources with other restoration paths if shared restoration is required. Note that although to provide clarity with the example, $E_0$ was defined above as the set of fiber spans, without loss of generality it can also represent any set of shared risk link groups ("SRLGs") over which one wishes to provide restoration. It is advantageous to define the following parameters:

1. $G_0$, the optical network topology.
2. The relationship of links to fiber spans.
3. $S_k$, the total number of channels reserved for use by service paths for each optical link $k \in E_0$.
4. $F_k$, the number of channels "in service" (e.g. assigned to working connections). The number of channels free for new connection requests is therefore $S_k - F_k$.
5. $R_k$ the total number of channels reserved for restoration on each optical link $k \in E_0$.
6. failneed$_{sk}$ the number of reserved, restoration channels needed on optical link $k \in E_0$ to reroute all failed connections when fiber span $s \in E_s$ fails. These channels would be used by the OXCs to reroute the connections (whose service paths route over fiber span s) to their restoration paths.
7. maxfailneed$_k$, the minimum number of reserved restoration channels needed on optical link $k \in E_0$ to meet a restoration objective to restore 100% of connections that fail from any single fiber span failure, e.g. maxfailneed$_k$=max{failneed$_{sk}$: fiber span $s \in E_s$}. Note that to meet the restoration objective $R_k \geq$ maxfailneed$_k$, i.e., at least this much restoration capacity must be installed.
8. $M_k$, the number of channels needed on fiber link k over all possible failures of the previously selected service path for V, i.e., $M_k$=max {failneed$_{sk}$: fiber span s is on the service path for connection request V}.
9. Routing weights, $w_k$, and Initial weights, $w_{0k}$, of link k. These quantities are used as a measure of the heuristic "cost" to the network. A path with a smaller total weight is typically preferable. The initial weights $w_{0k}$ are initialized to a value reflecting the hop count (e.g., $w_{0k}$=1) or approximate cost of a channel (e.g., a pro-rated approximation of the cost of OTS and OXC ports).

The parameters $S_k$ and $R_k$ can be determined by a capacity planning and augmentation process. Note that the quantities $S_k$ and $R_k$ have been broken out for clarity herein; nevertheless, it is also possible to let the channels for service paths and restoration paths be chosen from a combined pool of free channels.

Figure 4:
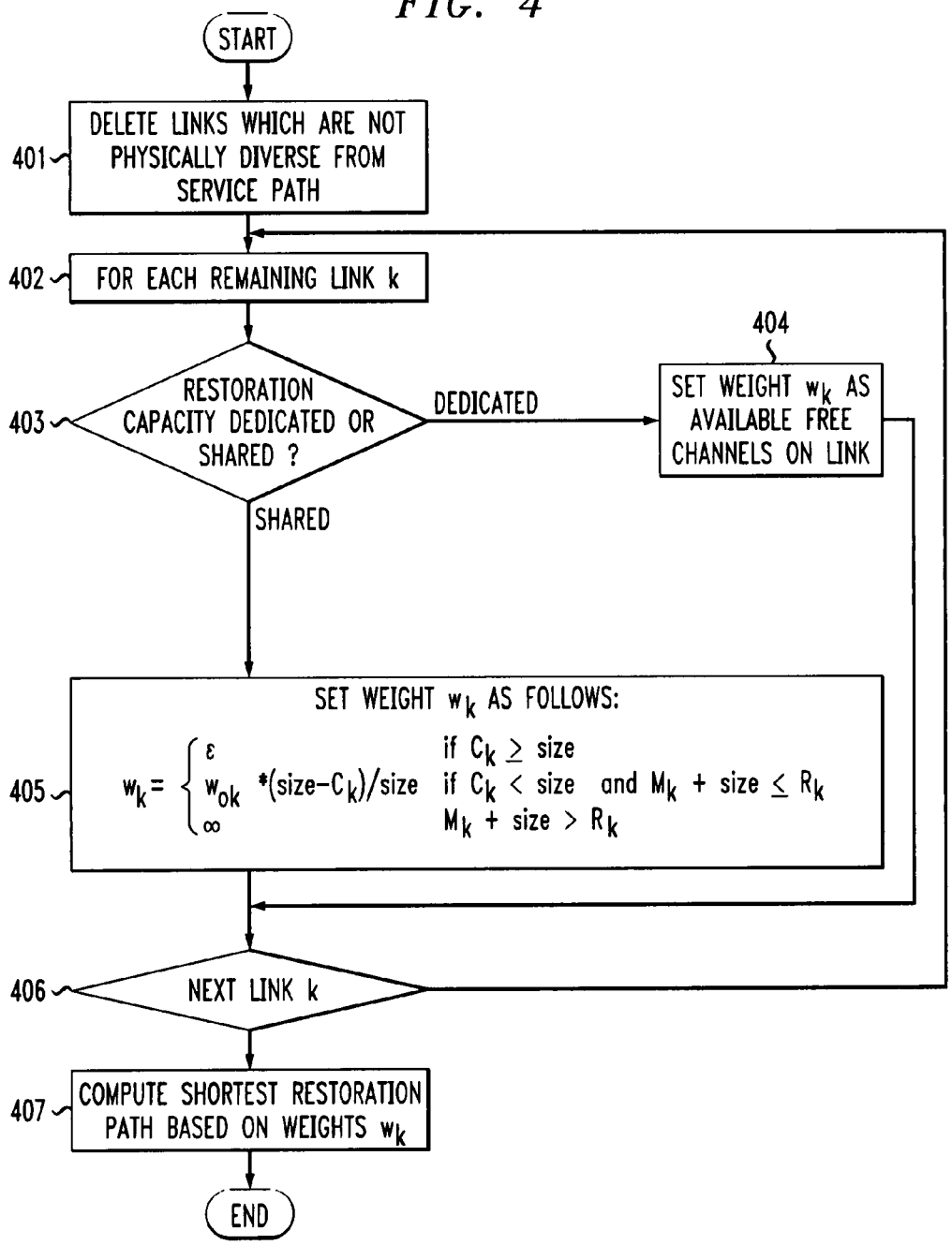
FIG. 4 is a flowchart of processing performed in computing a restoration path through the network.

FIG. 4 is a flowchart of processing performed in computing a restoration path through the network, in accordance with a preferred embodiment of this aspect of the invention. As described above, the restoration path should be physically diverse from the service path, e.g. fiber-span-disjoint. Such links may be identified manually or by using a method such as the one disclosed in co-pending commonly-assigned utility patent application, "SYSTEM AND METHOD FOR AUTO DISCOVERY OF RISK GROUPS IN OPTICAL NETWORK," Ser. No. 09/714,970, filed Nov. 20, 2000. At step 401, all links which are not physically diverse from the service path are deleted from the network topology graph, e.g. all links which share at least one fiber span with the links in the service path. Then, at steps 402 through 406, the weights of the remaining links are computed. If dedicated restoration is specified at step 403, then the weight is set to the available free channels on each link at step 404. If shared restoration is specified at step 403, then the restoration capacity can be shared by multiple restoration paths if their service paths do not share a common fiber span. When computing the restoration path, each link in the network must be weighted to reflect capacity sharing aspects. For shared restoration channels, the weights can be computed as shown at step 405, where $C_k$=maxfailneed$_k - M_k$ and represents the "spare" restoration channels on optical link k. That is, if the restoration path for connection V is routed over optical link k, and if the connection size does not exceed $C_k$ channels, then the total required restoration channels (also including failures other than the service path) on link k does not increase. The parameter ε is a small positive value which is defined to be much less than the weight on a link. The weight is set to E rather than zero so that the algorithm will not reuse capacity on shorter rather than longer paths. If there is insufficient reserved restoration capacity on the link, the link must be avoided by setting its weight to infinity. Furthermore, the weight is set to infinity if the optical link k has failed or if the control function for one of its end OXCs is failed. At step 407, the weights on the remaining links are used to compute the restoration path using some shortest path algorithm, e.g. Dijkstra's shortest path first algorithm.

All of the information needed for the computation of the service and restoration paths could be maintained at every OXC node. This would require maintaining the entire two-dimensional array, failneed$_{sk}$, at each OXC node. Whenever a new connection is provisioned, the matrix would need to be updated, e.g. by flooding of link state advertisement messages. In accordance with another aspect of the invention, however, portions of the array can be distributed around certain nodes whereby the array portions are updated along the restoration and service paths during connection establishment. This serves to avoid flooding and minimizes the storage requirements for this information. Thus, in accordance with a preferred embodiment of this aspect of the Invention, each cross connect stores only the one-dimensional arrays failneed$_{s*}$ for each fiber span s for which it is a master node and failneed$_{*k}$ for each optical link k∈$E_O$ for which it is a master node.

Figure 5:
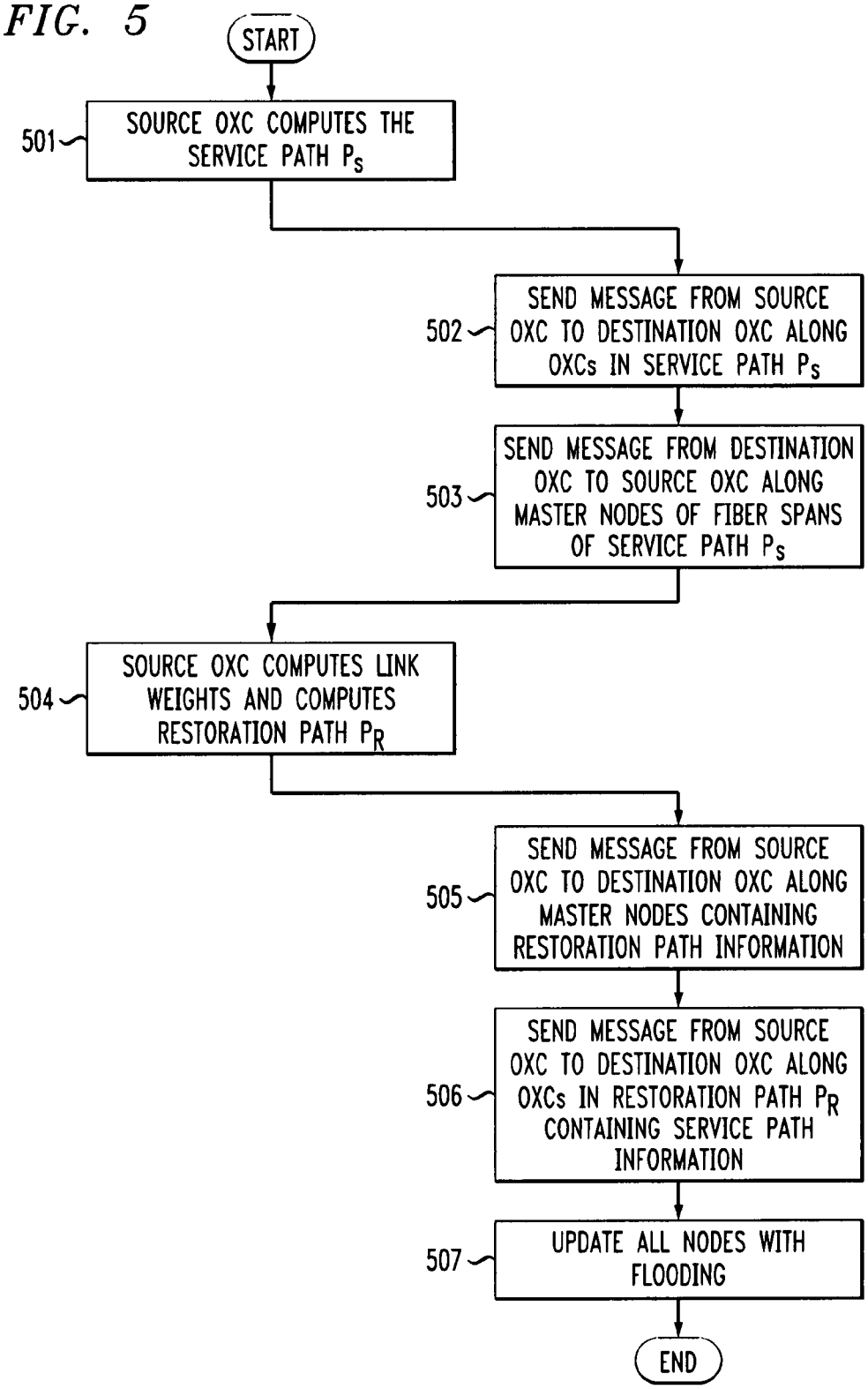
FIG. 5 is a flowchart of processing performed in distributing information for path selection in the network.

FIG. 5 is a flowchart of processing performed in computing and distributing information for the path selection computation in the network. In accordance with a preferred embodiment of the Invention, four signaling messages are sent. The particular signaling protocol used is not important to the invention; although to simplify the description, it is assumed below that the RSVP signaling protocol is being utilized. See, e.g., R. Braden, et al., ed., "Resource ReSerVation Protocol (RSVP)—Version 1 Functional Specification," IETF Network Working Group, RFC 2205 (September 1997). At step 501, the source OXC node computes the service path $P_s$, for example using the method described above. At step 502, the source OXC node sends a forward message, e.g. a RSVP "PATH" message, toward the destination OXC node along the route of nodes in $P_s$. The nodes, e.g. OXCs, set up cross-connections in parallel as the message traverses. Once the destination node receives the message, it replies at step 503 with a backward message, e.g. a RSVP "RESV" message, sent back towards the source node. The backward message is sent from destination to source along nodes that are master nodes of fiber spans of the service path. The message contains the $M_k$ array which is updated at each node which is a master of a fiber-span along the service path. At each such node (say, a master node of fiber span s) along the return path, the node will update the $M_k$ array as follows:

for each k∈$E_O$, $M_k$←max{$M_k$,failneed$_{sk}$}

Once the message reaches the source OXC node, the $M_k$ array is complete. The backward message serves to calculate the $M_k$ array and acknowledges the completion of the connection when received at the source node. At step 504, the source node computes the link weights and then computes the restoration path $P_r$, e.g. using the method described above. This restoration path information is passed at step 505 in a message from source to destination along the same nodes of the backward path, i.e., each node which is the master node of a fiber-span along the service path, $P_s$. This message contains the chosen restoration path (to be stored in the destination node) and is used to update the failneed$_{s*}$ and maxfailneed$_{k*}$ arrays. Each such master node, n, upon receiving the message, updates the array failneed$_{s*}$ as follows:

for each fiber span, s, in the service path for which n is a master node,
for each optical link, k, contained in the restoration path, failneed$_{sk}$←failneed$_{sk}$+size.

All other values of failneed$_{sk}$ remain unchanged. At step 506, a message from source to destination along the OXCs of the restoration path, $P_r$, is sent. This message contains the service path information $P_s$ and is used to update the failneed$_{*k}$ and maxfailneed arrays at master nodes of optical links along $P_r$. The message travels along the restoration path; and each master node, n, of an optical link, k, along the restoration path updates its failneed$_{*k}$ array as follows:

for each fiber span, s, contained in the service path failneed$_{sk}$←failneed$_{sk}$+size.

All other values of failneed$_{sk}$ remain unchanged. maxfailneed$_k$ is then updated accordingly. Finally, at step 507, the updated values of maxfailneed$_k$ (only for each fiber link, k, in the restoration path) as well as the updated values of $F_k$ (only for each fiber link, k, in the service path) are flooded to every node. Extended OSPF link-state advertisements can be used to update the changed elements of the F and maxfailneed arrays to each OXC in the network.

As an example of the processing performed in FIG. 5, consider a connection to be established between OXC node A (210) and OXC node F (260). First, a service path is selected, e.g. $P_s$=(A-C-F). A PATH message is sent along the path A-C-F. When node F (260) receives the PATH message, it sends out a backwards RESV message from node F (260) to node A (210). However, link F to C uses three fiber spans 1, 3, 5 with fiber span master nodes C (230), E (250), F (260) respectively. So node F (260) sends the RESV message along the path F-E-C-A to compute the $M_K$ information. After node A (210) receives the RESV message, it computes the restoration path, for example $P_r$\{A-D-F\}. Then node A (210) sends two PATH messages from node A (210) to node F (260). One is forwarded along A-C-E-F with $P_r$ information to store the restoration path at node F (260) and update the failneed$_{s*}$ arrays along the way. The last message is forwarded along the path A-D-F and contains $P_S$ information to update the failneed$_{*k}$ and maxfailneed$_k$ arrays. Of course, each link master node needs to update the number of free channels and number of reserved channels and let OSPF to flood to all other nodes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been presented particularly in the context of an optical networking architecture; however, the principles of the present invention could be extended to other cross-connect technologies. Such an extension could be readily implemented by one of ordinary skill in the art given the above disclosure.

What is claimed is:

1. A mesh telecommunication network having a plurality of nodes comprising:
   a destination node;
   a source node for selecting a restoration path in said mesh telecommunication network by
      sending a first message along a service path to the destination node,
      receiving, in response to the first message, a second message from the destination node via a return path, the second message containing an array storing a restoration link capacity for each link in the return path not in the service path, wherein at least some of the nodes in the return path update the array upon receipt of the second message and wherein, if said restoration link capacity is shared, said restoration link capacity is computed as follows restoration link capacity $w_k =$ $$\begin{cases} \varepsilon & \text{if } C_k \geq \text{size} \\ w_{0k} * (\text{size} - C_k)/\text{size} & \text{if } C_k < \text{size and } M_k + \text{size} \leq R_k, \\ \infty & M_k + \text{size} > R_k \end{cases}$$

where $M_k$ is the number of channels needed on fiber link k over all possible failures of a previously selected service path for a connection request V, $w_{0k}$ is an initial weight of link k, $R_k$ is a total number of channels reserved for restoration on each optical link k, $C_k$ represents spare restoration channels on optical link k, size is a connection size, and parameter $\epsilon$ is a value defined to be less than the weight on a link,
and if said restoration link capacity is dedicated, said restoration link capacity is set to available free channels on said link;
selecting a restoration path through the network from the source node to the destination node using the array; and
reserving resources for the restoration path in the network.

2. The mesh telecommunication network of claim 1 wherein the array comprises a matrix storing the restoration link capacity.

3. The mesh telecommunication network of claim 1 wherein the plurality of nodes in the network are cross-connects.

4. The mesh telecommunication network of claim 3 wherein the plurality of nodes in the network are optical cross-connects.

5. A mesh telecommunication network comprising:
   means for sending a first message along a service path to a destination node;
   means for receiving, in response to the first message, a second message from the destination node via a return path, the second message containing an array storing a restoration link capacity for each link in the return path not in the service path, wherein at least some of the nodes in the return path update the array upon receipt of the second message and wherein, if said restoration link capacity is shared, said restoration link capacity is computed as follows restoration link capacity $w_k =$ $$\begin{cases} \varepsilon & \text{if } C_k \geq \text{size} \\ w_{0k} * (\text{size} - C_k)/\text{size} & \text{if } C_k < \text{size and } M_k + \text{size} \leq R_k, \\ \infty & M_k + \text{size} > R_k \end{cases}$$

where $M_k$ is the number of channels needed on fiber link k over all possible failures of a previously selected service path for a connection request V, $w_{0k}$ is an initial weight of link k, $R_k$ is a total number of channels reserved for restoration on each optical link k, $C_k$ represents spare restoration channels on optical link k, size is a connection size, and parameter $\epsilon$ is a value defined to be less than the weight on a link,
and if said restoration link capacity is dedicated, said restoration link capacity is set to available free channels on said link;
means for selecting a restoration path through the network from the source node to the destination node using the array; and
means for reserving resources for the restoration path in the network.

6. The network of claim 5 further comprising means for storing said restoration link capacity in a matrix when a possible failure occurs.

7. The network of claim 6 further comprising means for sending a third message to update the array.

8. The network of claim 7 wherein the means for reserving resources for the restoration path further comprises means for sending a fourth message along the restoration path to the destination node in the network.

9. The network of claim 8 further comprising means for storing restoration link capacity in rows of the matrix in master nodes of shared risk link groups.

10. The network of claim 9 further comprising means for storing restoration link capacity in columns of the matrix in master nodes of links.

* * * * *